Jan. 18, 1966 C. A. SMITH 3,229,517
AEROLOGICAL MAPPING ARRANGEMENT
Filed Dec. 3, 1962 4 Sheets-Sheet 1

CHARLES ARTHUR SMITH
INVENTOR.

BY Don Finkelstein
ATTORNEY

CHARLES ARTHUR SMITH
INVENTOR.

BY Jor Finkelstein
ATTORNEY

Jan. 18, 1966  C. A. SMITH  3,229,517
AEROLOGICAL MAPPING ARRANGEMENT
Filed Dec. 3, 1962  4 Sheets-Sheet 4

INVENTOR.
CHARLES ARTHUR SMITH
BY

ATTORNEY

United States Patent Office 3,229,517
Patented Jan. 18, 1966

3,229,517
AEROLOGICAL MAPPING ARRANGEMENT
Charles Arthur Smith, 6511 Tampa Ave., Reseda, Calif.
Filed Dec. 3, 1962, Ser. No. 241,822
4 Claims. (Cl. 73—170)

This invention relates to the tethered balloon art and more particularly to an improved arrangement for providing a tethered balloon system that is capable for being maintained within a preselected altitude range for extended periods of time.

In many applications, such as weather reporting and the like, it is necessary to obtain information concerning geophysical phenomena over wide-spaced geographic points and at various altitudes for each of the points. The true problem can better be comprehended by analogizing the problem of adequate geophysical data collection to the problem of a three-dimensional mapping system. This problem is further complicated by the extended physical limits in which it is desired to accomplish the mapping. For example, the planar area may comprise a country, a continent, or the entire surface of the earth and the vertical height may comprise altitudes up to 100,000 or 150,000 feet. Thus, it is seen that obtaining adequate geophysical data depends upon obtaining accurate measurement of aerological characteristics throughout this vast three-dimensional domain.

The problem is even further complicated by the fact that in the vertical direction the aerological characteristics are continually changing and it is not only the absolute values of these characteristics that are desired, but also the changes in these aerological characteristics and the rate of change of these aerological characteristics that can provide much useful information to the aerologist.

Prior attempts to obtain this information have generally centered around widely scattered sampling data techniques. For example, free balloons have been utilized recently in an attempt to obtain sufficient data; however, these free balloons were not controllable in any particular dimension of the three-dimensional mapping and could provide information only in the path through which the vagaries of the weather allowed the free balloon to travel. The majority of weather stations maintained in the United States today launch free non-instrumented balloons for the purpose of gathering values of wind direction and velocity. A smaller number, using two radiosonde or rawinsonde balloons, and in a few cases, four, per day, are able to obtain data in only three additional parameters: humidity, temperature and pressure. Even in consideration of the recovery percentage and reconditioning of the radiosonde or rawinsonde unit, the man hour and material costs of this method of data collection on a national basis exceeds $10,000,000.00 annually and this expenditure barely provides sufficient points on a time curve for interpolation. There has also been some utilization of sounding rockets to gather high altitude information, but the cost, even in production quantities, for adequate instrumentation and the rocket itself would far exceed the cost now expended on the free balloon program to obtain substantially equivalent data. The weather satellite, of course, cannot provide the data necessary in regions of air up to say, 50 or 60 miles in altitude, but only scans large areas of the surface of the earth and is thus not suitable for obtaining the multiplicity of readings desired by the aerologist.

Thus, there has been a long-standing need for a system that will not only provide sufficient measurement of aerological characteristics to allow adequate mapping in a three-dimensional sense of the aerological phenomena, but also accomplish this result in an economical manner. To achieve this desiderata it is necessary that the instruments capable of measuring preselected aerological parameters be positioned at precisely known and controllable locations in the three-dimensional region over extended periods of time. That is, not only must the vertical height of the instruments be controllable, but also the horizontal deviation from a given point of each instrument must also be known.

Applicant's invention herein is able to provide the above-described desiderata based upon a significant discovery made by applicant. This discovery is that throughout the world there exists, almost invariably, at any given time a level of relatively light wind somewhere between 60,000 and 90,000 feet. By placing a tethered balloon comprising the main lifting capacity for an aerological mapping system at this altitude, the hazards and drawbacks of prior tethered balloons are generally eliminated. Thus, applicant's invention, broadly speaking, comprises a main lifting device, such as a balloon, coupled to a ground located winch means such as a reel by a main tether and the altitude for the main lifting device is controlled by the ground-located winch by reeling in or reeling out the main tether so that the main lifting device may be positioned at the altitude corresponding to the above-described light level wind. Thus, the more intense winds that may exist between the ground and this altitude of light wind are only felt by the main tether material which results in comparatively low drag forces, and the main lifting device is subjected only to light winds resulting in comparatively small drag forces.

A much smaller lifting device which may be termed a "secondary lifting device" is coupled to the main lifting device by a second tether and this secondary lifting device, which may comprise a small balloon, is adapted to be positioned, for example, at altitudes of 30,000 to 50,000 feet above the main lifting device for a given installation.

A first plurality of instrument packages is coupled to the main tether at preselected spaced intervals between the ground and the main lifting device and a second plurality of instrument packages is coupled to the second tether between the main lifting device and the secondary lifting device. Each of these instrument packages may contain any desired number of measuring or sampling instrumentation, such as humidity, wind velocity, temperature, wind direction, ion count, infrared and ultraviolet measuring devices, and the like instruments. In the preferred embodiment of the applicant's invention, each of these instrument packages is self-contained in that it contains a wind-driven generator for supplying electrical power to the instruments, solar cell sources, etc. Telemetering equipment is also supplied with each instrument package to allow transmittal of the measured aerological phenomena from the instrument package to the ground station.

The ground station includes the necessary reel means or winch and winch control mechanisms as well as the telemeter receiving and data reduction equipment.

The above and other embodiments of this invention are more fully disclosed in the following detailed description, with reference to the accompanying drawings wherein similar reference characters refer to similar elements, and in which.

Figure 1:
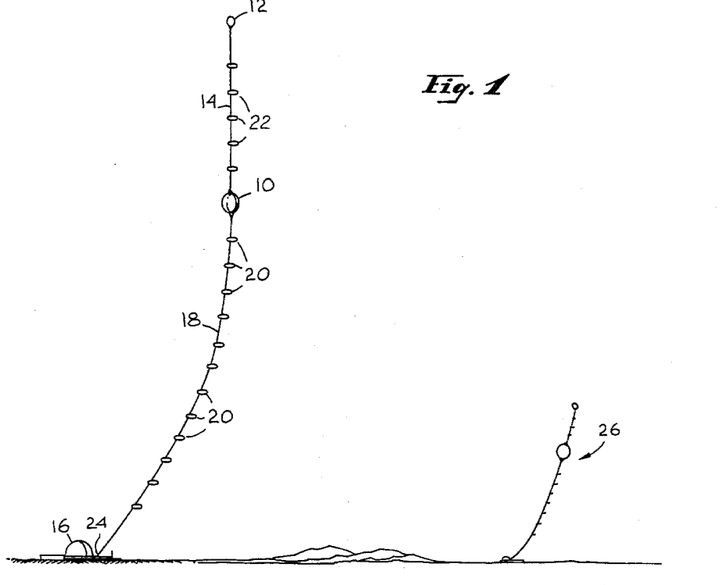
FIGURE 1 is a semischematic representation of one embodiment of applicant's invention.

Referring now to FIGURE 1, there is shown a semischematic representation of one embodiment of applicant's improved aerological mapping system. It will be appreciated than in any large geographical area a plurality of the systems shown in FIGURE 1 will be included to allow measurement of the aerological characteristics at various altitudes throughout a wide and extensive planar area. Each of the elements shown in semischematic form on FIGURE 1 is more fully discussed in following portions of the detailed description of applicant's invention. However, FIGURE 1 is presented to illustrate the general arrangement of the structure comprising applicant's invention herein.

As shown in FIGURE 1, an aerological mapping system comprising a main lifting device 10, a secondary lifting device 12 and a secondary tether means 14 coupling the main lifting device 10 to the secondary lifting device 12 are together connected to a ground station 16 by means of a main tether 18. A first plurality of instrument packages 20 is coupled to the main tether 18 and is spaced intermediate the ground station 16 and the main lifting device 10. Similarly, a second plurality of instrument packages 22 which, if desired, may be the same as the instrument packages 20, is coupled to the secondary tether 14 intermediate the main lifting device 10 and the secondary lifting device 12. The main tether 18 is coupled to the ground through a reel means or winch means 24 which is part of the ground station 16 equipment.

A second aerological mapping system generally designated 26 is located at a known separation, geographically, from the first aerological mapping system and is comprised of similar elements. As discussed above, a plurality of such systems is located throughout a given geographical planar area.

This aerological mapping system of FIGURE 1 is designed to be maintained aloft for extended periods of time, such as one year or more; however, to provide for the obtaining of measured parameters between the locations of the instrument packages 20 and 22, the winch means 24 may raise or lower the balloon system as desired during the time the system is aloft. Also, since the wind velocities encountered between the ground and the main lifting device 10 will vary, then the shape of the tether 18 will also vary to change the altitude of each of the instrument packages 20 and 22. Therefore, to obtain the same or a controlled altitude for a given instrument package despite variations in wind, it is also desirable to provide the winch means 24 so that the main lifting device 10 may be repositioned at a preselected altitude.

The altitude selected for the positioning of the main lifting device 10 is one where there is a comparatively low prevailing wind. Applicant has made a detailed study of aerological data collected by the United States Weather Bureau and has found that throughout at least the continental United States, and probably throughout the world, there exists at some altitude varying between 60,000 and 100,000 feet, a region of comparatively low wind velocities. This phenomena was perhaps unrecorded and uncollated prior to applicant's discovery thereof.

One of the main disadvantages with tethered balloons utilized in the past, however, has always been that high winds acting upon a large lifting device, such as a balloon, resulted in drag forces that the tether materials were incapable of withstanding. However, the drag load on the tether itself, as divorced and separate from the drag load imposed upon the balloon, is comparatively low and consequently if the balloon could be positioned at a region of low drag, then despite high wind loadings corresponding to high drag forces on the tether, the balloon will be stable.

Figure 2:
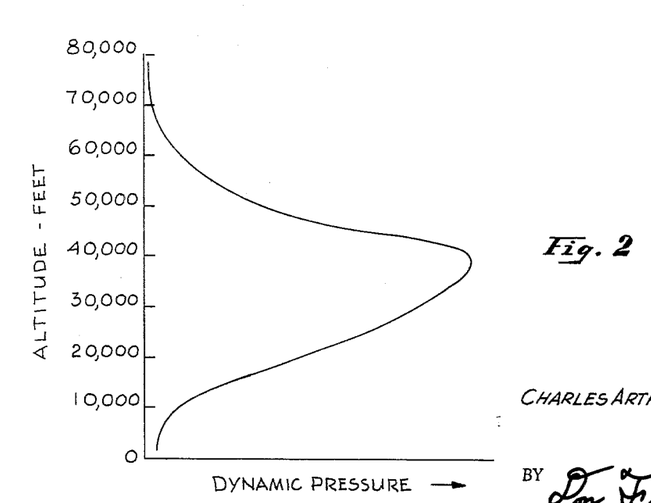
FIGURE 2 is a graph illustrating the dynamic pressure of the wind as a function of altitude.

This phenomena is illustrated by the curve of FIGURE 2. As shown in FIGURE 2, there is plotted the dynamic pressure of the wind as a function of altitude. The parameter "dynamic pressure" has been selected rather than the wind velocity itself, since it is the dynamic pressure that is in correspondence to the drag forces induced. For example, high winds at a low altitude where the air is dense will have a much higher dynamic pressure than the same velocity wind at a very high altitude where the air is comparatively rarified. Thus, even though the wind velocity itself may be high, the dynamic pressure and consequently the drag forces will be low at high altitudes. As shown here on FIGURE 2, the dynamic pressure of the wind has a peak at about 40,000 feet with lower values at both altitudes greater than 40,000 and altitudes less than 40,000. Thus, if the system illustrated in FIGURE 1 were to be raised to an altitude in a region where the wind condition exists as depicted in the curve of FIGURE 2, the main lifting device 10 could be positioned at an altitude of approximately 75,000 feet where the dynamic pressure on the main lifting device would be low and hence the drag forces would be low. The secondary lifting device 12 would then be at an altitude of, for example, 105,000 feet. The high dynamic pressure between 20,000 and 70,000 feet only acts upon the main tether 18 and the instrument packages 20. Compared to the drag exerted on the main lifting device 10, the drag forces on the tether 18 and the instrument packages 20 is comparatively low and the system depicted on FIGURE 1 will be stable for this altitude condition.

If the wind profile were to change, and for example, there were to be heavy winds at 75,000 to 80,000 feet which would induce comparatively high dynamic pressures and high drag forces on the main lifting device 10, the winch 24 may be actuated to allow extension of the tether 18 to allow positioning of the main lifting device 10 at a higher altitude so that it is in the region of low-level winds.

Figures 3, 3A, 3B, 4:
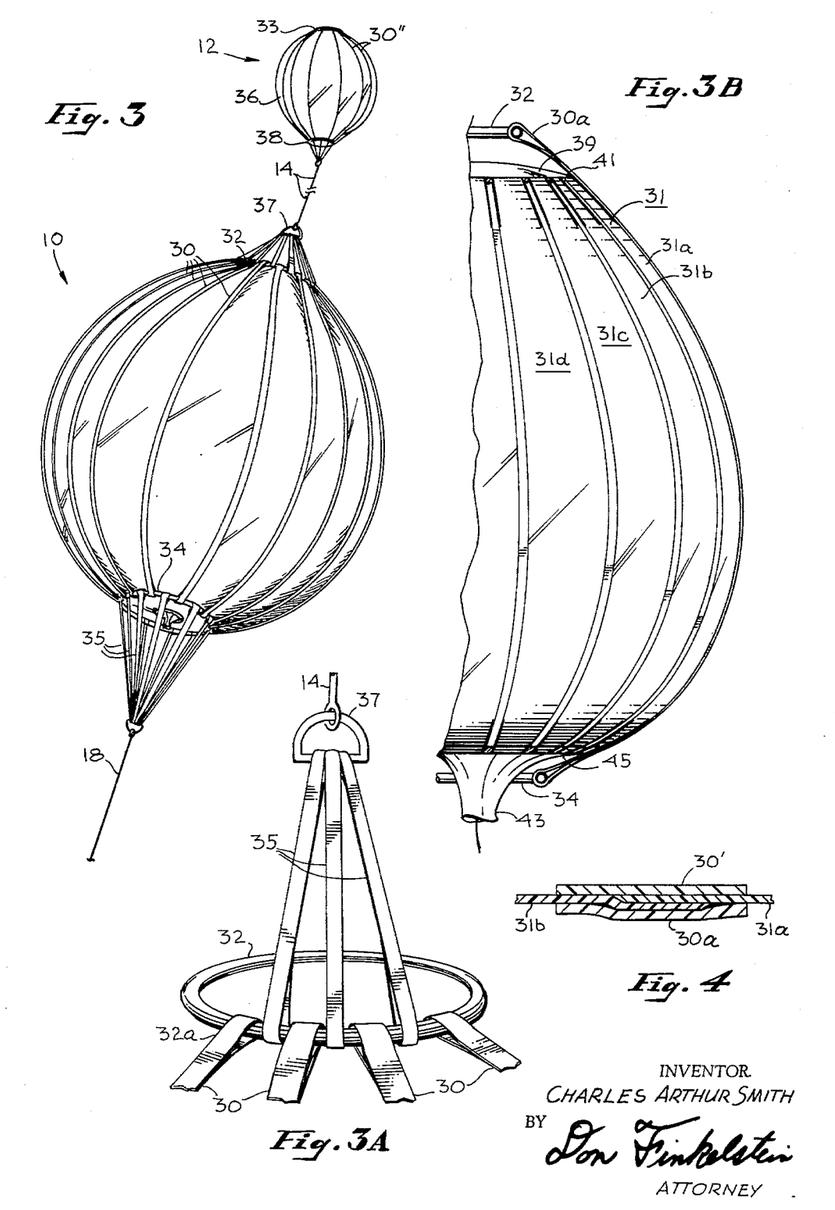
FIGURES 3, 3A and 3B illustrate the preferred arrangement of lifting devices in applicant's invention.
FIGURE 4 illustrates the structure associated with a preferred embodiment of the lifting devices in applicant's invention.

In order to minimize weight and cost of the system shown in FIGURE 1, it is desirable in the preferred embodiment of applicant's invention that the secondary lifting device 12 be coupled to the main lifting device 10 by a fixed length of secondary tether 14. FIGURE 3 illustrates the preferred arrangement of the main lifting device 10 and the secondary lifting device 12. It will be appreciated that many other arrangements of the two lifting devices could also be utilized in applicant's invention. Therefore, by illustrating the arrangements shown on FIGURE 3, it is not intended that this be construed as a limitation on applicant's invention herein.

The main lifting device 10 may comprise a balloon 31 of polyethylene or mylar or any other similar material. The high strength-to-weight ratio of these materials as well as their low permeability to a lifting gas such as helium, hydrogen, or the like, which is contained within the balloon 31, has made these two materials desirable as the basic materials for fabrication of the balloon 31. The gas, such as helium, which is lighter than air, is contained within the balloon 31 and provides the lift capacity of the main lifting device 10. A plurality of load tapes 30 is coupled to the balloon 31 and these load tapes 30 terminate in an upper load ring 32 at the top of the main lifting device 10 and in a lower load ring 34 at the bottom of the main lifting device 10. The main tether 18 is coupled to the lower load ring 34, as described below, and the secondary tether 14 is coupled to the upper load ring 32, as described below. The load tapes 30 are bonded to the balloon 31 of the main lifting device 10.

FIGURE 4 shows a cross-sectional view through one load tape 30a and the method of coupling the load tape 30a to the balloon 31 of the main lifting device 10. As shown on FIGURE 3B, the balloon 31 of the main lifting device 10 is comprised of a plurality of "orange-peel slice" segments bonded together. Thus, two such segments, 31a and 31b, are shown on FIGURE 4 along the seam with the load tape 30a. The segments 31a and 31b are shown in FIGURE 4 as being bonded together in an overlap configuration. However, other bonding arrangements could also be utilized such as interlocking and butt bonding. The load tape 30a is bonded to the outside of the segments 31a and 31b extending on either side of the bond area between the segments 31a and 31b. The load tape 30a extends around the balloon and, as stated above, terminates in the upper load ring 32 and lower load ring 34.

For added strength, applicant has also found it advantageous in some applications to incorporate a plurality of interior load tapes, such as load tape 30', on the interior of the balloon 31 of main lifting device 10. These interior load tapes, such as 30', may, if desired, extend around the interior of the balloon 31 and are substantially coextensive in area with the load tapes 30a on the exterior.

The secondary lifting device 12 is fabricated in a manner similar to that described above for the main lifting device 10. A balloon 36 of the secondary lifting device 12 is also fabricated in "orange-peel slice" segments upon which the load tapes 30'' are bonded. The load tapes 30'' terminate in a lower load ring 38 to which the secondary tether 14 is coupled, as described below. Interior load tapes (not shown) may also be included in the secondary lifting device 12 if desired. However, since, in the preferred embodiment of applicant's invention, the lift capacity of the secondary lifting device 12 is comparatively small, the added strength provided by internal load tapes may not be required.

Applicant has found that the combination of a main lifting device 10 with a secondary lifting device 12 having a much smaller lift capacity in the main lifting device 10 provides an added advantage during launching of applicant's system herein. For example, the smaller secondary lifting device 12, having a lift capacity on the order of 1/20 to 1/30 of the lift capacity of the main lifting device 10, may be launched first by somewhat conventional methods, as the lift capacity and hence the size is comparatively small. As this secondary lifting device 12 is launched the secondary tether 14 is raised into the air and the lift force from the secondary lifting device 12 as well as the drag force is exerted on the tether 14 through the upper load ring 32, load tapes 30 and lower load ring 34 of the main lifting device 10. This provides at least a component of a vertical force on the main lifting device 10 during the launch thereof and a much greater degree of stability during launch is afforded due to this vertical force. Thus, the launch operation of the main lifting device 10 is greatly simplified. The preferred launch method for applicant's aerological system herein is described in more detail below.

FIGURE 3A illustrates the details of a preferred method of coupling applicant's main lifting device 10 to applicant's secondary lifting device 12. The load tapes 30 are coupled to and go around the upper load ring 32. In this embodiment illustrated in FIGURE 3A the load tapes 30 are not continuous around the main lifting device 10, but rather are a plurality of individual segments. Intermediate each pair of load tapes 30 is a secondary load member 35 also coupled to the upper load ring 32 and to a D-ring 37. The secondary load bearing members 35 provide the transition from the circular orientation of the upper load ring 32 to a linear array on the D-ring 37. The secondary tether 14, in turn, is coupled to the D-ring 37 to provide a continuous force between the secondary lifting device 12 and the main lifting device 10. This arrangement for coupling the load tapes 30 to the upper load ring 32 is similar to that utilized in coupling the load tapes 30 to the lower load ring 34 in that a plurality of secondary load bearing members (not shown) is coupled to a D-ring (not shown) similar to the D-ring 37, and the main tether 18 is coupled to this other D-ring. This again provides a transition from the horizontally-disposed lower ring 34 to the vertically-disposed main tether 18.

FIGURE 3B illustrates in detail a preferred arrangement for applicant's invention of coupling the external load tapes 30 to the main balloon 31. As stated above, the balloon 31 is comprised of a plurality of individual orange-peel type segments 31a, b, c and d, for example, which in balloon terminology are generally called "gores." At the seam between each adjacent pair of gores, such as 31a and 31b, a load tape 30a is provided. This load tape 30a is preferably heat-sealed to the gores in the arrangement shown below in FIGURE 4. In this arrangement the external load tapes 30 are not continuous around the balloon, but extend from the upper load ring 32 to the lower load ring 34 and are sealed to the balloon 31 at points in between. The gores 31a, b, c and d are not continuous to an apex at the top and bottom of the balloon 31, but preferably terminate a fixed distance from the theoretical point at which they would meet. The balloon is then closed on the top with a spherical segment shaped cap 39 to which each of the gores is heat-sealed along its upper edge 41. The bottom of the main lifting device 10 is provided with a funnel-type cap 43 that provides a continuous vent to atmosphere of the gas contained within the balloon 31. The lower edges 45 of each gore 31a, b, c and d are heat-sealed to this funnel. The funnel, by allowing a continuous vent to atmosphere, insures that in the case of overexpansion of the gas contained within the balloon 31 the balloon will not rupture, but rather the excess gas will be vented to atmosphere through the funnel 43.

The secondary lifting device 12 having the secondary balloon 36 may also be constructed in a manner similar to that described for the main lifting device 10. Additional tertiary lifting devices could be coupled to the secondary lifting device 12 in a manner analogous to the connection of the secondary lifting device 12 to the main lifting device 10.

Applicant has described his preferred embodiment as incorporating a balloon 31 to provide the main lift for his main lifting device 10 and a balloon 36 to provide the lift for his secondary lifting device 12. While in many applications balloons may provide the most economical arrangement for applicant's invention herein, it will be appreciated that other lifting devices both buoyant and aerodynamic may be incorporated to provide the lift in either the main lifting device 10 or the secondary lifting device 12. Thus, for example, the main lifting device 10 could provide a kite or a winged member that would provide aerodynamic lift as opposed to the buoyant lift or balloon 31. A similar arrangement could also be provided for the secondary lifting device 12. Combinations of both buoyant lifting devices and aerodynamic lifting devices for the main lifting device 10 and the secondary lifting device 12 in arrangement considered most advantageous for a given installation could be incorporated in any of the embodiments of applicant's invention herein. As shown on FIGURE 1, a first plurality of instrument packages 20 is coupled to the main tether 18 and a second plurality of instrument packages 22 is coupled to the secondary tether 14. These instrument packages may comprise any desired configuration and contain any selected experiments or measuring instruments it is desired to incorporate. However, as one of the main purposes of applicant's invention herein is to provide a plurality of measurements of various aerological phenomena, there is illustrated on FIGURE 5 a preferred instrument package that applicant has found desirable for inclusion in his aerological mapping system.

Figures 5, 7, 8, 9:
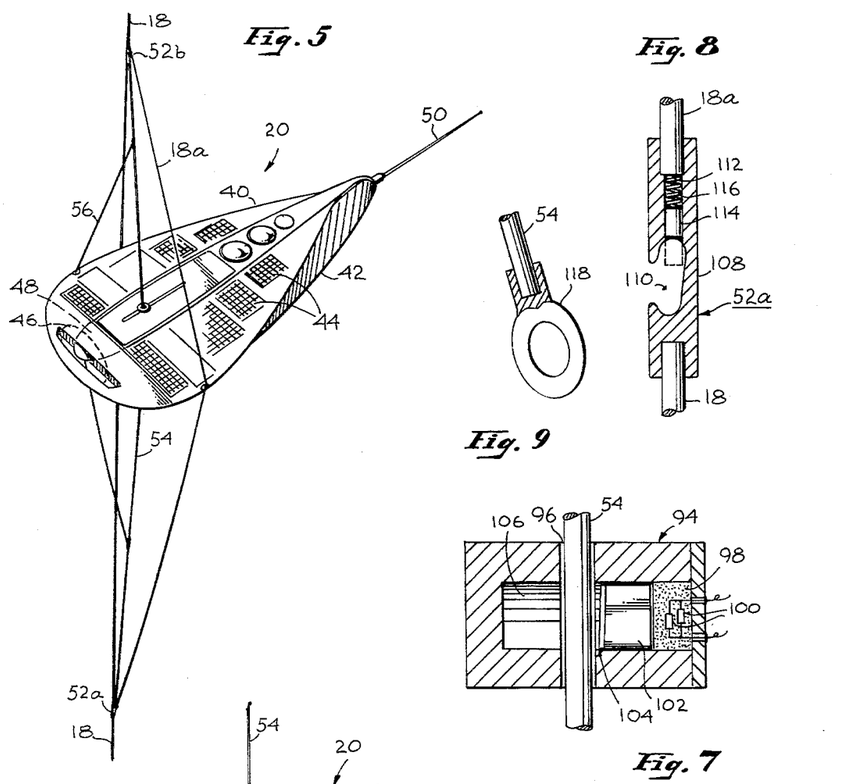
FIGURE 5 illustrates an instrument package utilized in applicant's invention.
FIGURE 7 illustrates a cable cutter utilized in applicant's invention.
FIGURES 8 and 9 illustrate a quick release mechanism for the instrument packages illustrated in FIGURE 5.

As shown on FIGURE 5, the instrument package 20 comprises a winged portion 40 coupled to a body portion 42. The winged portion 40 extends substantially at right angles to the tether 18. The method of attaching the instrument package 20 to the tether 18 is discussed in more detail below in connection with the description of applicant's FIGURES 7, 8 and 9. The instrument package 20 shown in FIGURE 5 may also be utilized as the instrument packages 22 that are coupled to the secondary tether 14 or, if desired, substantially different instrument packages may be utilized for the instrument packages 22.

The instrument package 20 is preferably selfcontained in that there is provided in each of the instrument packages 20 a source of electrical energy for operation of the various items of equipment incorporated within the instrument package 20. Thus, on the upper surface of the winged portion 40 a plurality of solar cells 44 is provided to allow direct conversion of incident sunlight into electrical energy for ultimate utilization in the instrument package 20. Similarly, a wind-driven turbine 46 is provided as a source of power and the turbine 46 drives a generator 48. The generator 48 provides the main source of electrical energy for the instruments contained within the instrument package 20 and is utilized when there is insufficient sunlight incident on the solar cells 44 for conversion to electrical energy or when the batteries not shown in FIGURE 5 but discussed more completely below are in low power, and also to recharge the batteries. Telemetering antenna 50 is provided with the instrument package 20 to allow transmission of the information signals obtained by the various instruments in the instrument package 20.

The main tether 18 is provided with a first quick release 52a positioned below the instrument package 20 and a second quick release 52b positioned above the instrument package 20. It will be appreciated that the instrument package 20 shown on FIGURE 5 and the method of attachment thereof to the tether 18 is satisfactory and may be utilized for each of the individual instrument packages 20 or 22 shown on FIGURE 1.

A support line 54 extends from the first quick release 52a through the instrument package 20 and into the second quick release 52b. The support line 54, in passing through the instrument package 20, passes through a cable cutter (not shown on FIGURE 5) which, upon receipt of the appropriate signal severs the support line 54 which releases the instrument packages 20 from the main tether 18.

A guy support 18a is rigidly coupled to the quick release 52a and the quick release 52b and extends around the instrument package 20 and is coupled to the outside of the winged portion 40 thereof. A secondary guy support 56 is coupled to the main support 54 and extends around the winged portion 40 on the side opposite to the place of connection of the guy support 18a. This secondary guy support 56 also is coupled to the wing portion 40. Secondary guy support 56 has a first end coupled to the support line 54 intermediate the first quick disconnect 52a and the instrument package 20 and a second end coupled to the support line 54 intermediate the quick disconnect 52b and the instrument package 20. When the support line 54 is severed by operation of the cable cutter, the ends of the support line 54 are released from the quick disconnects 52a and 52b. The tension load imposed in the guy support 18a exerts a lateral force on the instrument package 20 as the guy support 18a is pulled into alignment with the tether 18. As the guy support 18a is pulled into this alignment, the lateral force exerted on the instrument package 20 tends to remove it from the path of the tether 18 and allow it to fall freely. During this free fall a parachute contained within the instrument package 20 may be deployed to allow the instrument package 20 to be recovered.

Figure 6:
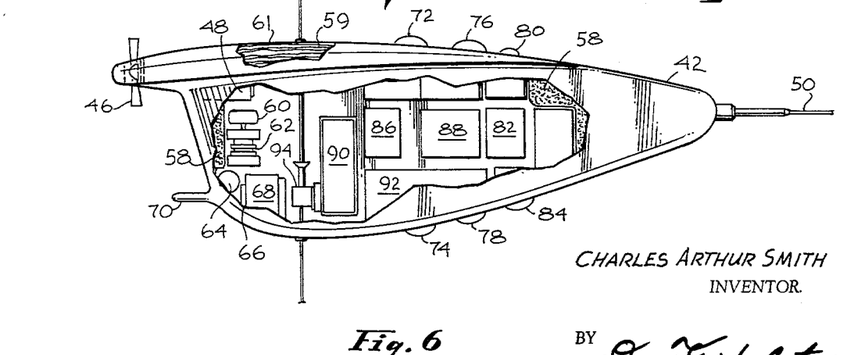
FIGURE 6 illustrates the details of construction of the instrument package shown in FIGURE 5.

FIGURE 6 illustrates a sectional view of the instrument package 20 shown on FIGURE 5. This view shows a general arrangement of the instrumentation contained within the instrument package 20. It will be appreciated that, for other instruments carried within the instrument package 20, different arrangements will be utilized. For light weight and structural rigidity in the instrument package 20, applicant has found it desirable to fill those spaces not occupied by instrumentation or equipment with a foam material 58, such as expanded polystyrene, which may either be foamed in place or cut into preformed portions and bonded into place, or polyurethane or similar such structure.

The wind-driven generator 48 provides the basic source of electricity for operating the instruments contained in the instrument package 20. These instruments include a pitch and yaw sensor 60, a wind speed sensor 62, a barometer 64 and temperature and humidity sensors 66 and 68. A pilot tube 70 is also included to provide appropriate measurements.

These are somewhat the general aerological testing instrumentation that is desired in aerological evaluations. However, other more specialized instruments may also be included and these may include an infrared sensor 72 and an infrared reflection sensor 74. The infrared sensor 72 is positioned to measure and infrared radiation incident upon the upper surface of the instrument package 20 such as that from sunlight, clouds and the like, while the infrared reflection sensor 74 is positioned to measure the infrared reflection incident upon the lower surface of the body portion 42 of the instrument package 20 as might be reflected from the earth. Similarly, an ultraviolet sensor 76 and an ultraviolet reflection sensor 78 are also provided.

A scintillation counter 80, cosmic radiation sensor 82 and geomagnetic sensor 84 are also included in the instrument package 20 for more specialized instrumentation and measurement. Similarly, an ion content sensor 86 and a spectrophotometer 88 are also provided.

In addition to the turbine-driven generator 48 and solar cells 44, batteries 90 are also included to provide electrical energy to the above-described instruments as well as for the telemetering equipment. The generator 48 is utilized to charge the batteries 90. A transmitter receiver 92 receives the information signals from the various instruments and telemeters the signals through the telemetering antenna 50. The main support 54 in passing through the instrument package 20 passes through a cable cutter 94 which is electrically actuated upon receipt of the appropriate signals. It is not anticipated that the instrument package 20 will be separated from the tether 18 by operation of the cable cutter 94 except in emergency conditions such as rupture of the main lifting device 10, breakage of the tether 18, or similar such situation.

FIGURE 7 illustrates one arrangement of a cable cutter 94 that applicant has found particularly advantageous in utilization with his aerological system. The support wire 54 passes through an aperture 96 in the cable cutter 94. A pyrotechnic charge means 98 is contained in the cable cutter 94 and is electrically actuated by a pair of squibs 100 contained therein. When the squibs 100 are actuated the pyrotechnic charge 98 is ignited and the gases provided therefrom drive a piston 102, which has a cutting edge 104, through the cable 54 and into a cavity 106 located on the opposite side of the aperture 96 in the cable cutter 94. This severs the tension and releases the support line 54 and allows the instrument package 20 to be ejected from the main tether 18.

The quick release 52a is illustrated in detail in FIGURE 8. The quick release 52a is comprised of a body portion 108 generally cylindrical in form. The length of the body portion 108 is preferably made as short as possible to allow incorporation of the quick release 52a on the winch 24 during reelin and reelout of applicant's aerological system. The tether 18 is rigidly coupled to a first end of the body portion 108 and the guy support 18a is rigidly coupled to a second end of the body portion 108. Intermediate the first and second ends there is provided an aperture 110 that is adapted to receive a ring, hook or other connecting mechanism, as described below. The body portion 108 is also provided with an axial cavity 112 in which there is positioned a piston 114 and an actuating spring 116.

As shown in FIGURE 9, the support line 54 is rigidly coupled to a ring means 118. The ring means 118 could be replaced by a hook or other conventional element to provide the same function. The ring means 118 is adapted to fit into the aperture 110 of the quick release 52a and depresses the piston 114 into the position shown in solid lines when the support line 54 is in tension. When the support line 54 is severed by actuation of the cable cutter 94, tension is relieved and the spring 116 forces the piston 114 into the postion shown by dotted lines on FIGURE 8, and the ring 118 is ejected from the cavity 110, thus allowing the instrument package to fall free.

The instrument package 20 may be, if desired, rigidly secured to the main support 54, or the main support 54 may just pass through the instrument package without being rigidly coupled thereto. In either event, when the support 54 is severed the instrument package 20 is ejected away from the aligned position of the main tether 18 by action of the guy support 18a. If the instrument package 20 is not rigidly coupled to the support line 54, then the severed ends of the support line 54 slide free of the instrument package 20 and the severed portions of the support line 54 are ejected as above-described from the quick release 52a. The operation of the quick release 52b is identical to that of the quick release 52a.

Applicant has also found that in some embodiments of applicant's invention the main tether 18 may not be a constant diameter, but may be a variable diameter between the winch 24 and the main lifting device 10. The secondary tether 14 may, if desired, also have a variable diameter but, however, since the lift capacity of the secondary lifting device 12 is comparatively low, it is generally not advantageous to introduce the complexities of a variable diameter tether for the second tether 14.

Figures 10, 11, 12:
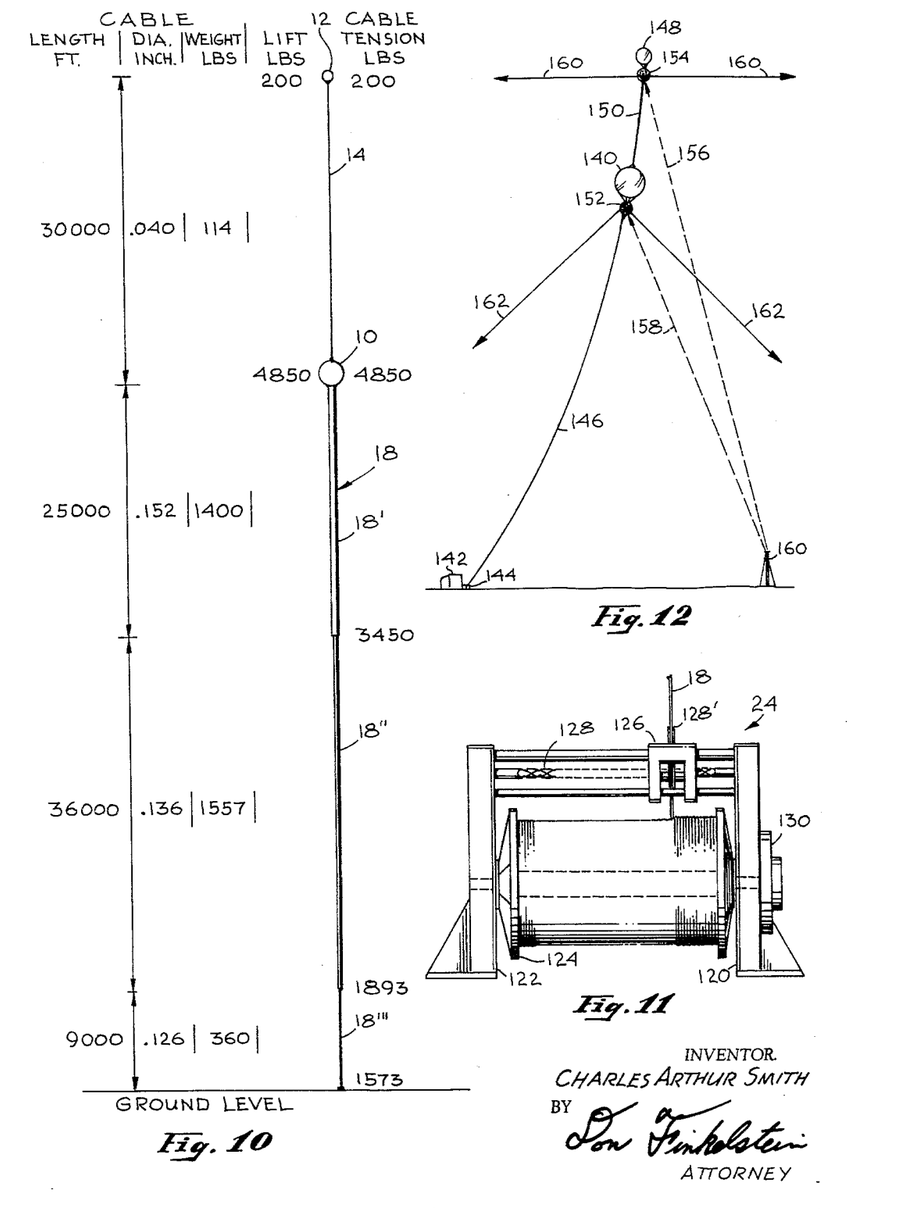
FIGURE 10 is a graphical representation of the various parameters associated with applicant's invention.
FIGURE 11 illustrates a winch mechanism useful in applicant's invention.
FIGURE 12 illustrates a semischematic representation of another embodiment of applicant's invention.

FIGURE 10 illustrates in graphical form the various parameters associated with the tether in applicant's aerological mapping system. The instrument packages 20 and 22 have been omitted from the drawing on FIGURE 10 for clarity. As shown on FIGURE 10, the main lifting device 10 and the secondary lifting device 12 are separated by a distance of 30,000 feet of .040 inch diameter steel wire. This comprises the secondary tether 14. The secondary lifting device 12 has a lift capacity of 200 pounds. Since 30,000 feet of .040 inch diameter steel wire weighs 114 pounds, there is a net available lift of 86 pounds for the instrument packages 22 which are coupled to the secondary tether 14. It is assumed for the purposes of discussion of FIGURE 10, that the instrument packages 22 which are not shown in FIGURE 10 weigh approximately 86 pounds, and thus the tension of the tether 14 at the top of the main lifting device 10 is approximately zero.

The main lifting device 10 is assumed, once again, for purposes of illustration in describing the embodiments of applicant's invention shown on FIGURE 10, to have a lift capacity of 4,850 pounds. The tether 18 is comprised, for purposes of illustration, of three distinct portions: the first portion 18′, the second portion 18″, and a third portion 18‴. The first portion 18′ is coupled to the main lifting device 10 and comprises 25,000 feet of .152 inch diameter steel wire. This wire weighs approximately 1400 pounds. The tension in the tether 18 at its connection to the main lifting device 10 is 4850 pounds, and for this lift, will be substantially constant regardless of the configuration of the tether 18 at altitudes below the main lifting device 10.

A second portion 18″ of the main tether 18 is comprised of 36,000 feet of .136 inch diameter steel wire which weighs approximately 1,557 pounds, and the third portion 18‴ of the main tether 18 is comprised of 9,000 feet of .126 inch diameter wire which weighs approximately 320 pounds. Thus, it can be seen that the tension in the main tether 18 constantly decreases as the altitude decreases. Thus, for example, the tension at the connection between the first portion 18′ and the second portion 18″ is 3,450 pounds and the tension at the connection between the second portion 18″ and the third portion 18‴ is 1,893 pounds. This would provide a tension at ground level of 1,573 pounds which is the weight available for the instrument packages 20. In the actual design of applicant's aerological system it is preferred that the main lifting device 10 and the secondary lifting device 12 both be provided with an overlift capacity. This overlift capacity is in the preferred embodiment of applicant's invention, approximately ten percent of the total weight that the respective lifting devices are required to support.

It will be appreciated that the main tether 18 could also be provided with a tether material that is continuously decreasing in diameter from the main lifting device 10 to the ground level. Thus, instead of a stepped cable as illustrated on FIGURE 10, the tether 18 would have its diameter continually decreasing. In other embodiments a constant diameter tether could be utilized.

For the configuration shown in FIGURE 10, the main lifting device 10 is at an altitude of 75,000 feet and the secondary lifting device 12 is at an altitude of 100,000 feet. From FIGURE 10 it can also be seen that providing the secondary lifting device 12 allows a considerable reduction in the lift capacity required for the overall system. Since the tension in the cable is always greatest at the maximum altitude where it is coupled to the lifting device, by providing a secondary lifting device a comparatively thin cable may be utilized for the secondary tether 14 and still allow positioning of instrument packages 22 at altitudes greater than the altitude of the main lifting device 10 without the necessity of providing much heavier cable as would be required for only a single lifting device configuration.

It will also be appreciated that a plurality of tertiary lifting devices could be coupled above the secondary lifting device 12 to provide still higher altitude aerological measurements with a decreasing overall system weight capacity and requirement.

The reel means or winch 24 utilized for reeling in and reeling out applicant's aerological system may be of any conventional design. FIGURE 11 illustrates one type winch that applicant has found preferable for utilization in his aerological system. As shown on FIGURE 11 the winch 24 is comprised of a pair of bracket supports 120 and 122 that support a rotating drum 124 upon which the main tether 18 is wound. There may also be included a level wind mechanism comprising a level wind carriage 126 and a level wind rod 128 is provided intermediate the brackets 120 and 122 and disposed above the rotating drum 124. A counter pulley 128 is also provided to allow counting of the total number of feet reeled in or reeled out.

In operation, the main tether 18 comes over the counter pulley 128 through the level wind carriage 126 and is wound upon the drum 124. The level wind carriage 126 moves progressively along the level wind rod 128 first in one direction and then with coming to the end of the rod the direction is automatically reversed. This lays the main tether 18 evenly upon the rotating drum 124. A brake and governor assembly 130 of conventional design is also provided to allow control of the reelin and reelout rate.

The winch 24 is part of the ground station 16 shown on FIGURE 1. The ground station 16 also includes the necessary equipment for receiving the information signals transmitted from the instrument packages 20 and 22 and converting these information signals into the desired form for ultimate utilization. Conventional triangulation methods may be utilized to locate the position of the various instrument packages 20 and 22 as well as the position of the main lifting device 10 and secondary lifting device 12. To aid in the location and determination of the exact location of these components the main lifting device 10 and secondary lifting device 12 may be comprised of metalized material for higher radar reflectivity. Also, to control the heating and cooling rates of the lifting gas contained within the main lifting device 10 and secondary lifting device 12, it is desirable in some applications to fabricate the balloon portions of the main lifting device 10 and secondary lifting device 12 of a Tabor-type material that has a high absorptivity for solar radiation and a low emissivity for infrared radiation. This will allow the gases to be maintained at substantially the same temperature despite variations in incident electromagnetic radiation environment.

In another embodiment of applicant's invention this aerological system may also be utilized for a television communications and relay system. This is shown schematically in FIGURE 12. As shown on FIGURE 12, a main lifting device 140 is connected to a ground station 142 through a winch means 144 by a main tether 146. A secondary lifting device 148 is connected to the main lifting device 140 by a secondary tether 150. These items described as part of the structure of the embodiment shown in applicant's invention of FIGURE 12 may be similar to the corresponding items of structure shown and described in connection with the embodiment of FIGURE 1.

A first instrument package 152 is coupled to the main tether 146 below the main lifting device 140. A second instrument package 154 is coupled to the secondary tether 150 below the secondary lifting device 148. The first instrument package 152 and the second instrument package 154 are both self-contained in that they comprise means including means for generating and storing electrical energy as well as other means described below. The first instrument package 152 and the second instrument package 154 are both adapted to receive television signals illustrated by dashed arrows 156 and 158 transmitted by television transmitter 160 that is located on the ground. The television signals are received by the instrument packages 152 and 154 and are retransmitted therefrom. The signals, in the preferred embodiment of applicant's invention shown on FIGURE 12, are transmitted from the second instrument package 154 in a direction indicated by the solid arrows 160 and the antenna associated with the second instrument package 154 is adapted to transmit these television signals in a direction substantially horizontally where they can be received by other instrument packages coupled to other aerological systems at geographically-spaced locations to provide wide area television coverage.

The television signals transmitted from the first instrument package 152 are transmitted downwardly toward the ground for reception by ground receiving stations or home television sets. Thus, the antenna connected to the first instrument package 152 is designed to transmit the television signals within the cone illustrated by solid arrows 162. This arrangement illustrated on FIGURE 12 allows wide range television coverage from a comparatively few ground located television transmitting stations. With this system, wherein the aerological balloon system illustrated thereon may be kept aloft for extended periods such as years or more, the cost of this wide area television coverage is a fraction of the cost of, for example, other wide range television coverage systems such as orbiting satellites.

In launching the embodiments of applicant's invention illustrated in FIGURE 1 and FIGURE 12, applicant has found it advantageous to utilize the following described launching technique. Since the secondary lifting device has a comparatively low lift and is comparatively small, it is easier to launch because the wind-induced drag forces upon it are comparatively low. Thus, the secondary lifting device is first launched and allowed to extend out to the full length of the secondary tether. This may be accomplished by a reel, by stretching the secondary tether flat along the ground throughout its full length and then controlling the amount of tether that is allowed to rise with the secondary balloon lifting device or any other technique. When the secondary lifting device is raised to its desired altitude as controlled by the wind and the length of secondary tether, the free end of the secondary tether is coupled to the upper load ring of the main lifting device, if it has previously been separate. After the secondary tether is coupled to the upper load ring of the main lifting device, the launching of the main lifting device may be started. The main lifting device is filled with the appropriate amount of lifting gas and starts to ascend. The vertical component of the force transmitted to the load ring by the secondary tether provides a stability during this portion of the launch by maintaining an upwardly-directed force on the main lifting device during the launching thereof. This upwardly-directed force combined with the tension imposed by the main tether coupled to the lower load ring stabilizes the main lifting device and prevents whipping of the main lifting device due to actions of the wind or other forces. The winch means unreels the main tether allowing the main lifting device to ascend at a preselected rate. This is continued until the main lifting device is at its designed altitude.

During the unreeling of the main tether from the winch the instrument packages are coupled into the tether as described above. The unique arrangement for detachably coupling these instrument packages to the tether provides considerable time saving during the launch as opposed to making separate splices and connections. A similar procedure for coupling in the instrument packages may be utilized for the instrument packages coupled to the secondary tether intermediate the main lifting device and the secondary lifting device.

Many other launch techniques and methods may also be utilized to lauch applicant's aerological system described herein. It will be appreciated, however, that once the system is launched and erected by properly positioning the main lifting device at the altitude corresponding to low level winds the system may be maintained aloft for extended periods of time. Thus, the instrument packages must be designed to satisfactorily operate without service for these extended periods of time. If it is ever found that one instrument package is defective by properly signaling the cable cutter in an instrument package, that instrument package may be detached and recovered without the necessity of lowering the entire system. As shown on FIGURE 6, a parachute 59 is contained in the parachute compartment 61 of the instrument package 20. This parachute is deployed automatically when the instrument package 20 is separated from the tether 18.

This concludes the description of applicant's improved aerological system. From the above it can be seen that such a system provides a high degree of reliability at a a comparatively low cost for allowing the gathering of aerological information throughout extended regions of space. Those skilled in the art will find variations and adaptations of applicant's invention. Therefore, the foregoing description of the various embodiments of applicant's invention together with the accompanying drawings are intended to be illustrative and not limiting and the appended claims are intended to cover all variation and The embodiments of the invention in which an exclusive property or privilege is claimed are defined as follows:

1. In combination:
   a first lifting member having a first lift capacity and adapted to be positioned at a first preselected altitude;
   a second lifting member having a second lift capacity substantially less than said first lift capacity and adapted to be positioned at a second altitude greater than said first altitude;
   a first cable means for connecting said first lifting member to said second lifting member;
   a first plurality of instrument packages coupled to said first cable means in spaced relationship intermediate said first and said second lifting members, and each of said instrument packages comprising means for measuring preselected atmospheric parameters and means for transmitting information signals proportional to said measured atmospheric parameters;
   stepped cable means coupled to said first lifting member and to a reel means, said stepped cable member having a greater diameter adjacent said first lifting member than adjacent said reel and said reel means adapted to reel and unreel said stepped cable member to thereby increase and decrease said preselected altitudes;
   means for securing said reel member to the ground; and
   a second plurality of instrument packages coupled to said stepped cable in spaced relationship intermediate said reel and said first lifting member, each of said second plurality of instrument packages comprising means for measuring a preselected atmospheric parameter and means for telemetering an information signal proportional to said atmospheric parameter.

2. The arrangement defined in claim 1 wherein said first preselected altitude is on the order of 60,000 to 80,000 feet above the ground and said second preselected altitude is on the order of 90,000 to 110,000 feet.

3. The arrangement defined in claim 1 wherein said first lift capacity is on the order of 5,000 pounds and said second lift capacity is on the order of 200 pounds.

4. A method for sustaining a tethered aerological ballon system aloft for extended periods of time, said tethered areological balloon system being of the kind comprising a first lifting device and a second lifting device coupled to said first lifting device, said second lifting device having a lift capacity substantially less than said first lifting device and a first plurality of instrument packages coupled intermediate said first and said second lifting devices and a second plurality of instrument packages coupled to said first lifting device and spaced intermediate said first lifting device and the ground and at least part of said first plurality of instrument packages and said second plurality of instrument packages adapted to measure the velocity of the wind and to telemeter an information signal proportional to said measured velocity of the wind comprising the steps of:
   selectively detecting said telemetered information signals and responsively positioning said first lifting member at an altitude corresponding to substantially the minimum detected wind velocity whereby said second lifting member is positioned at an altitude greater than said first lifting member.

References Cited by the Examiner

UNITED STATES PATENTS

| | | | |
|---|---|---|---|
| 1,296,687 | 3/1919 | Nichols | 343—706 X |
| 1,913,511 | 6/1933 | Reynolds | 73—189 |
| 2,283,919 | 5/1942 | Diamond et al. | 73—170 |
| 2,365,778 | 12/1944 | Schwab | 244—33 X |
| 2,381,531 | 8/1945 | Ehmann | 24—230.5 |
| 2,431,938 | 12/1947 | Jalbert | 244—33 |
| 2,591,986 | 4/1952 | Weiss et al. | 24—230.5 |
| 2,865,583 | 12/1958 | Winkler | 244—137 |
| 2,924,408 | 2/1960 | Yost | 244—137 |
| 2,941,750 | 6/1960 | Smith et al. | 244—32 |
| 2,958,829 | 11/1960 | Hay | 73—170 X |
| 3,005,604 | 10/1961 | McDonald | 244—33 |
| 3,035,441 | 5/1962 | Aagard | 73—170 |
| 3,098,380 | 7/1963 | Suomi et al. | 73—170 |

FOREIGN PATENTS

| | | |
|---|---|---|
| 482,657 | 4/1952 | Canada. |
| 544,282 | 4/1942 | Great Britain. |

RICHARD C. QUEISSER, *Primary Examiner.*

JOSEPH P. STRIZAK, DAVID SCHONBERG,
*Examiners.*